United States Patent
Rahman et al.

(10) Patent No.: US 8,134,955 B2
(45) Date of Patent: Mar. 13, 2012

(54) METHOD AND APPARATUS FOR MEDIA INDEPENDENT HANDOVER

(75) Inventors: Shamim Akbar Rahman, Montreal (CA); Ulises Olvera-Hernandez, Kirkland (CA); Mahmoud Watfa, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 1030 days.

(21) Appl. No.: 12/015,923

(22) Filed: Jan. 17, 2008

(65) Prior Publication Data
US 2008/0175253 A1 Jul. 24, 2008

Related U.S. Application Data

(60) Provisional application No. 60/885,505, filed on Jan. 18, 2007.

(51) Int. Cl.
*H04W 4/00* (2009.01)
(52) U.S. Cl. ........................................ 370/328; 370/331
(58) Field of Classification Search ........................ None
See application file for complete search history.

(56) References Cited

U.S. PATENT DOCUMENTS

| | | | |
|---|---|---|---|
| 6,965,767 B2 | 11/2005 | Maggenti et al. | |
| 7,406,324 B1 | 7/2008 | McConnell | |
| 7,483,984 B1 | 1/2009 | Jonker et al. | |
| 2003/0225912 A1 | 12/2003 | Takeda et al. | |
| 2004/0153547 A1 | 8/2004 | Trossen | |
| 2006/0274697 A1 | 12/2006 | Kim et al. | |
| 2006/0276192 A1 | 12/2006 | Dutta et al. | |
| 2006/0277298 A1* | 12/2006 | Kim et al. .................... | 709/224 |
| 2006/0291423 A1 | 12/2006 | Carlton | |
| 2007/0072605 A1 | 3/2007 | Poczo | |
| 2007/0091846 A1* | 4/2007 | Kim et al. .................... | 370/331 |
| 2007/0110075 A1 | 5/2007 | Olvera-Hernandez | |
| 2007/0197214 A1 | 8/2007 | Faccin et al. | |

(Continued)

FOREIGN PATENT DOCUMENTS

RU 2283542 9/2006

(Continued)

OTHER PUBLICATIONS

Al Mosawi et al., "A Novel Micro Mobility Solution Based on Media Independent Handover and SIP," IEEE Vehicular Technology Conference, pp. 1-5 (Sep. 1, 2006).

(Continued)

*Primary Examiner* — Nittaya Juntima
*Assistant Examiner* — Tito Pham
(74) *Attorney, Agent, or Firm* — Volpe and Koenig, P.C.

(57) ABSTRACT

A method and apparatus for performing a handover are disclosed. An Internet protocol (IP) multimedia subsystem (IMS) client registers with an IMS network and establishes a media independent handover (MIH) session with an MIH application server using a session initiation protocol (SIP). The IMS client establishes a session for IP-based service, (e.g., voice over IP (VoIP)), with a communication peer using an SIP. MIH messages are exchanged for handover with the MIH application server over IP. After handover, the session is resumed. A serving call session control function (S-CSCF) triggers the MIH application server based on a string "MIH services" and a unique identifier included in an INVITE request. The IMS client may send a REFER request to the MIH application server after the handover to resume the session. Alternatively, the IMS client may send a RE-INVITE request to the MIH application server and the communication peer.

20 Claims, 14 Drawing Sheets

U.S. PATENT DOCUMENTS

| | | | |
|---|---|---|---|
| 2007/0280453 A1* | 12/2007 | Kelley et al. | 379/201.01 |
| 2007/0291792 A1 | 12/2007 | Watfa et al. | |
| 2008/0062926 A1 | 3/2008 | Oba | |
| 2008/0096558 A1 | 4/2008 | Liu et al. | |
| 2009/0061776 A1 | 3/2009 | Takei et al. | |
| 2009/0271859 A1 | 10/2009 | Trossen | |
| 2010/0048213 A1 | 2/2010 | Kim et al. | |
| 2010/0131663 A1 | 5/2010 | Lee et al. | |
| 2010/0150110 A1* | 6/2010 | Dutta et al. | 370/331 |
| 2010/0325292 A1 | 12/2010 | Takeda et al. | |

FOREIGN PATENT DOCUMENTS

| | | |
|---|---|---|
| WO | 2005/018200 | 2/2005 |
| WO | 2005/065163 | 7/2005 |
| WO | 2006/125471 | 11/2006 |
| WO | 2007/015068 | 2/2007 |
| WO | 2007/113524 | 11/2007 |

OTHER PUBLICATIONS

Campbell et al., "Session Initiation Protocol (SIP) Extension for Instant Messaging", Network Working Group, Request for Comments: 3428, (Dec. 2002).

IEEE P802.21/D02.00 "Draft IEEE Standard for Local and Metropolitan Area Networks: Media Independent Handover Services", IEEE P802.21™ /D02.00, Sep. 2006.

Lan Man Standard Committee of the IEEE Computer Society, "Draft IEEE Standard for Local and Metropolitan Area Networks: Media Independent Handover Services", IEEE P802.21™ /D03.00, (Dec. 2006).

Levin, "Suppression of Session Initiation Protocol (SIP) REFER Method Implicit Subscription", Network Working Group, Request for Comments: 4488, (May 2006).

Rahman et al., "Seamless Mobility for IMS using IEEE 802.21 and SIP," Wireless WIFI Convergence Conference (Apr. 17-20, 2007).

Rosenberg et al., "SIP: Session Initiation Protocol", Network Working Group, Request for Comments: 3261, (Jun. 2002).

Schoenwaelder, "Overview of the 2002 IAB Network Management Workshop", Network Working Group, Request for Comments: 3535, (May 2003).

Third Generation Partnership Project, "Technical Specification Group Core Network and Terminals; IP Multimedia Call Control Protocol based on Session Initiation Protocol (SIP) and Session Description Protocol (SDP); Stage 3 (Release 6)," 3GPP TS 24.229 V6.17.0 (Dec. 2007).

Third Generation Partnership Project, "Technical Specification Group Core Network and Terminals; IP Multimedia Call Control Protocol based on Session Initiation Protocol (SIP) and Session Description Protocol (SDP); Stage 3 (Release 5)," 3GPP TS 24.229 V5.18.0 (Sep. 2006).

Third Generation Partnership Project, "Technical Specification Group Core Network and Terminals; IP Multimedia Call Control Protocol based on Session Initiation Protocol (SIP) and Session Description Protocol (SDP); Stage 3 (Release 5)," 3GPP TS 24.229 V5.21.0 (Dec. 2007).

Third Generation Partnership Project, "Technical Specification Group Core Network and Terminals; IP Multimedia Call Control Protocol based on Session Initiation Protocol (SIP) and Session Description Protocol (SDP); Stage 3 (Release 6)," 3GPP TS 24.229 V6.13.0 (Dec. 2006).

Third Generation Partnership Project, "Technical Specification Group Core Network and Terminals; IP Multimedia Call Control Protocol based on Session Initiation Protocol (SIP) and Session Description Protocol (SDP); Stage 3 (Release 7)," 3GPP TS 24.229 V7.6.0 (Dec. 2006).

Third Generation Partnership Project, "Technical Specification Group Core Network and Terminals; IP Multimedia Call Control Protocol based on Session Initiation Protocol (SIP) and Session Description Protocol (SDP); Stage 3 (Release 7)," 3GPP TS 24.229 V7.10.0 (Dec. 2007).

Third Generation Partnership Project, "Technical Specification Group Core Network and Terminals; IP Multimedia Call Control Protocol based on Session Initiation Protocol (SIP) and Session Description Protocol (SDP); Stage 3 (Release 8)," 3GPP TS 24.229 V8.2.0 (Dec. 2007).

* cited by examiner

INVITE sip:ieee802dot21@domain.com SIP / 2.0
Via : SIP/2.0/ UDP [ currentIPAddress ] ; branch =z9hG4bKxyz
Route : <sip:[ 5555::pc:s:c:f ] :753 ;branch=8uetb
Route : <sip:orig@scscf1.home1.fr;1r>
To : MIH Server <sip:ieee802dot21@domain.com>
From : IMS Client A <sip:imsClientA@domain.com>;tag
Call - ID : someNumber@currentIPAddress.com
Cseq : 1 INVITE
Max - Forwards : 70
Contact : <sip:[ currentIPAddress ] : *port#*>
Content - Disposition : session
Content - Type : application/sdp
Content - Length : value v = 0
o = Bob ##### ##### IN IP4 ( or IP6 ) currentIPAddress
s = *MIH Services MIHF ID*
c = IN IP4 ( or IP6 ) [ currentIPAddress ]

REFER sip:ieee802dot21@domain.com SIP / 2.0
Via : SIP/2.0/UDP [ newIPAddress ]
To : MIH Server <sip:ieee802dot21@domain.com>
From : IMS Client A <sip:imsClientA@domain.com>;tag
Call-ID : someNumber@currentIPAddress.com
Cseq : ####REFER
Max-Forwards : 70
Refer-To : <sip:imsClientB@example.com;method=INVITE; *Call-ID%*id_of_call_with_ClientB%>
Refer-Sub : false
Contact : <sip:[ currentIPAddress ]:port#>
Content-Disposition : session
Content-Type : application/sdp
Content-Length : *value*

506

504 v = 0
o = Bob ##### ##### IN IP4 ( IP6 ) NewIPAddress
s = *MIH Services MIHF ID*
c = IN IP4 ( or IP6 ) [ NewIPAddress ]

INVITE sip:imsClientB@example.com SIP/2.0
Via: SIP/2.0/UDP [ NewIPAddress ]; branch =z9hG4bKxyz
To: IMS Client B <sip:imsClientB@example.com>
From: IMS Client A <sip:imsClientA@domain.com>;tag
Call-ID callIDOfOngoingDataSession@currentIPAddress.com
Cseq: ####INVITE
Max-Forwards: 70
Contact: <sip:[NewIPAddress]: *port#*>
Content-Type: application/sdp
Content-Length: value v=0
o=IMS Client A ##### ##### IN IP4 (or IP6) NewIPAddress
c=IN IP4 (or IP6) [NewIPAddress]

INVITE  *sip:ieee802dot21@domain.com* SIP/2.0
Via: SIP/2.0/UDP [NewIPAddress]; branch=z9hG4bKxyz
To: MIH Server <sip:ieee802dot21@domain.com>
From: IMS Client A <sip:imsClientA@domain.com>;tag
Call-ID: *someNumber@currentIPAddress.com*
Cseq: #### INVITE
Max-Forwards: 70
Contact: <sip:[NewIPAddress]:*port#*>
Content-Disposition: session
Content-Type: application/sdp
Content-Length: value

704 v = 0
o = IMS Client A ##### ##### IN IP4 (or IP6) NewIPAddress
s = *MIH Services MIHF ID*
c = IN IP4 (or IP6) [NewIPAddress]

METHOD AND APPARATUS FOR MEDIA INDEPENDENT HANDOVER

CROSS REFERENCE TO RELATED APPLICATION

This application claims the benefit of U.S. provisional application No. 60/885,505 filed Jan. 18, 2007, which is incorporated by reference as if fully set forth.

FIELD OF INVENTION

The present invention is related to a media independent handover between heterogeneous wireless networks.

BACKGROUND

Internet protocol (IP) multimedia subsystem (IMS) is a standardized next generation networking (NGN) architecture for providing mobile and fixed multimedia services. IMS uses a session initiation protocol (SIP) and runs over IP. IMS can be used for many different services, (e.g., instant messaging, video streaming, voice over IP (VoIP), and any other IP-based services).

The goal of IMS is to provide all the services, current and future, that the Internet provides. One of the methods used to provide these services is through an IMS application server. The IMS application server is a network entity that hosts and executes one or more IP services. An application server is triggered to provide a service by a serving call session control function (S-CSCF) which is a central node in the IMS signaling plane.

The IEEE 802.21 standard defines mechanisms and procedures that aid in the execution and management of inter-system handovers. Under IEEE 802.21, three main services can be accessed by mobility management applications in order to aid in the management of handover operations and system discovery and selection. These services include an event service, an information service, and a command service. These services do not depend on each other and, as a result, may be delivered independently.

Currently, there are no interfaces or mechanisms that describe how IEEE 802.21 services may interact with existing mobility management and handover functionality already defined within the relevant third generation partnership project (3GPP) or similar wireless standards specifications. There are no procedures or functionality to integrate IEEE 802.21 services within 3GPP or other wireless standards unless existing mobility management mechanisms and handover procedures are modified. Therefore, an MIH application server that is capable of integrating MIH services in a 3GPP or other wireless standards based network is required.

SUMMARY

A method and apparatus for performing a handover are disclosed. An IMS client registers with an IMS network and establishes an MIH session with an MIH application server using an SIP. The IMS client establishes a session for IP-based service, (e.g., VoIP), with a communication peer using an SIP. MIH messages are exchanged for handover with the MIH application server over IP. After handover, the session is resumed. A S-CSCF triggers the MIH application server based on a string "MIH services" and a unique identifier included in an INVITE request. The IMS client may send a REFER request to the MIH application server after the handover to resume the session. Alternatively, the IMS client may send a RE-INVITE request to the MIH application server and the communication peer.

BRIEF DESCRIPTION OF THE DRAWINGS

A more detailed understanding may be had from the following description, given by way of example and to be understood in conjunction with the accompanying drawings wherein:

FIG. 4 is an example INVITE request message;

FIG. 5 is an example REFER request message;

FIG. 6 is an example RE-INVITE request message destined for an IMS client;

FIG. 7 is an example RE-INVITE request message destined for an MIH application server.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment.

It should be noted that embodiments will be explained with reference to VoIP services as an example and embodiments are applicable to any other services, (e.g., instant messaging, video streaming, or any other IP-based services), that involve setting up a session.

Figure 1:
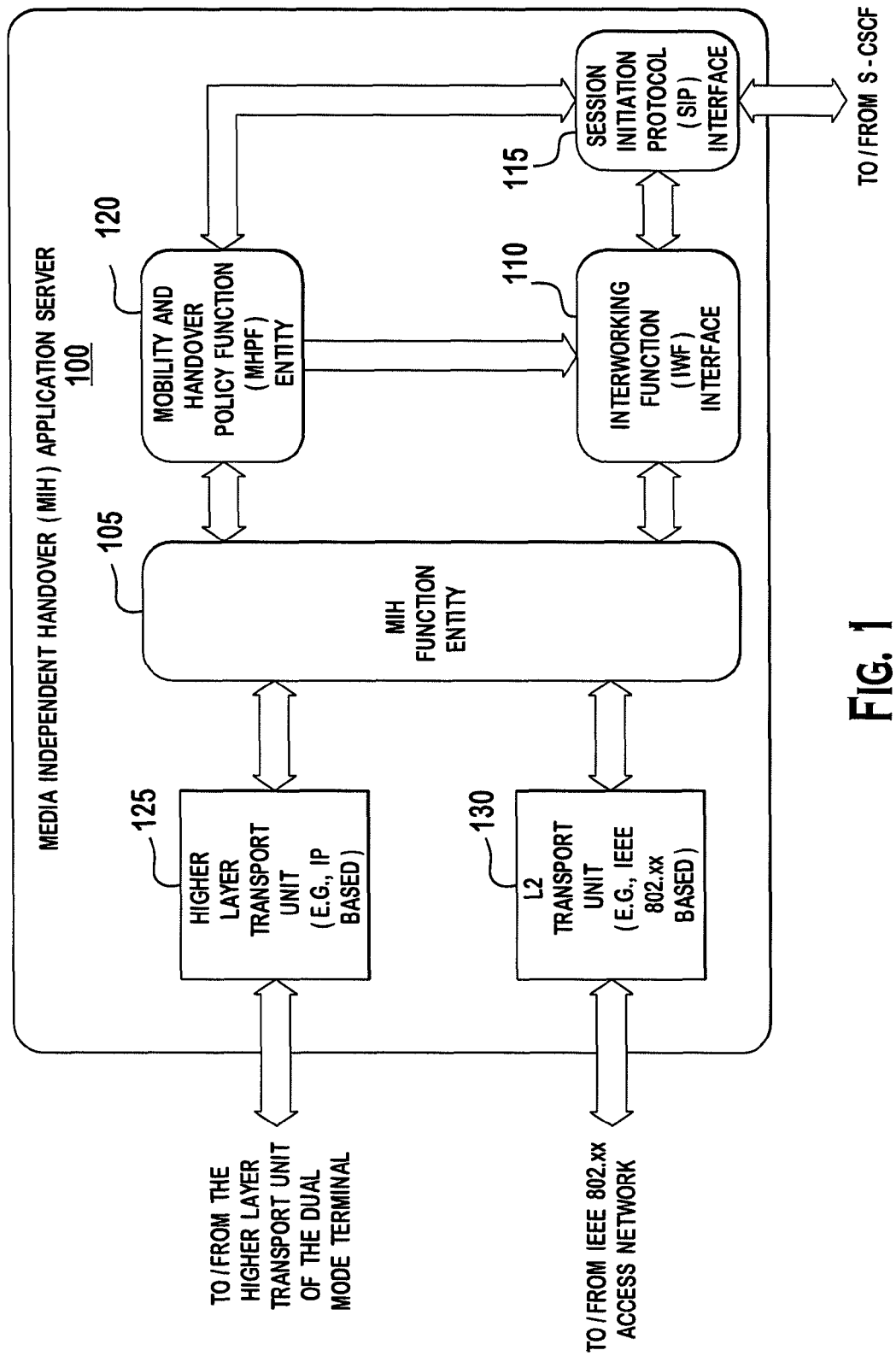
FIG. 1 is a block diagram of an MIH application server.
Figure 2A:
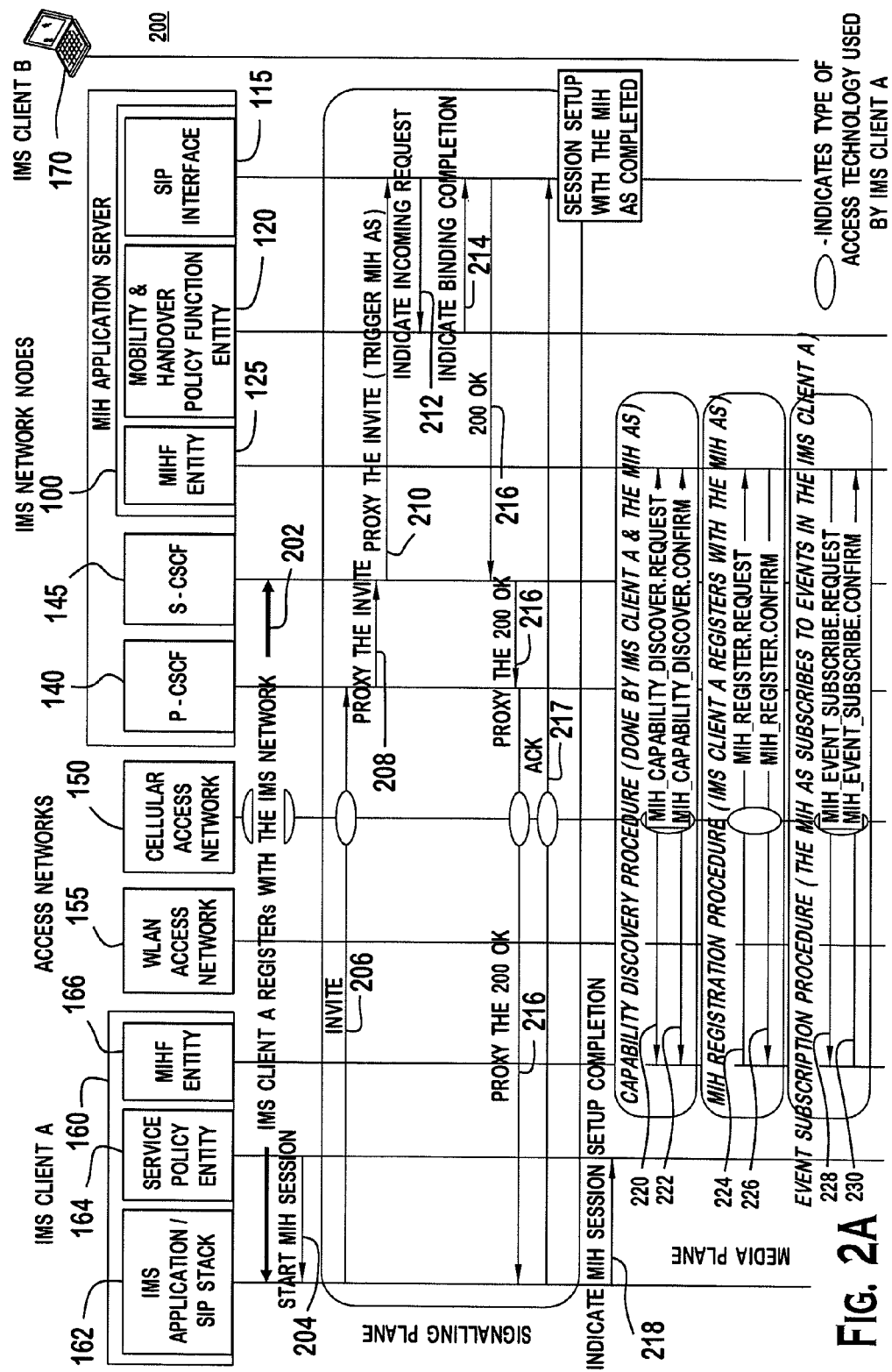
FIGS. 2A-2D are an example call flow for handover in accordance with one embodiment.
Figure 2B:
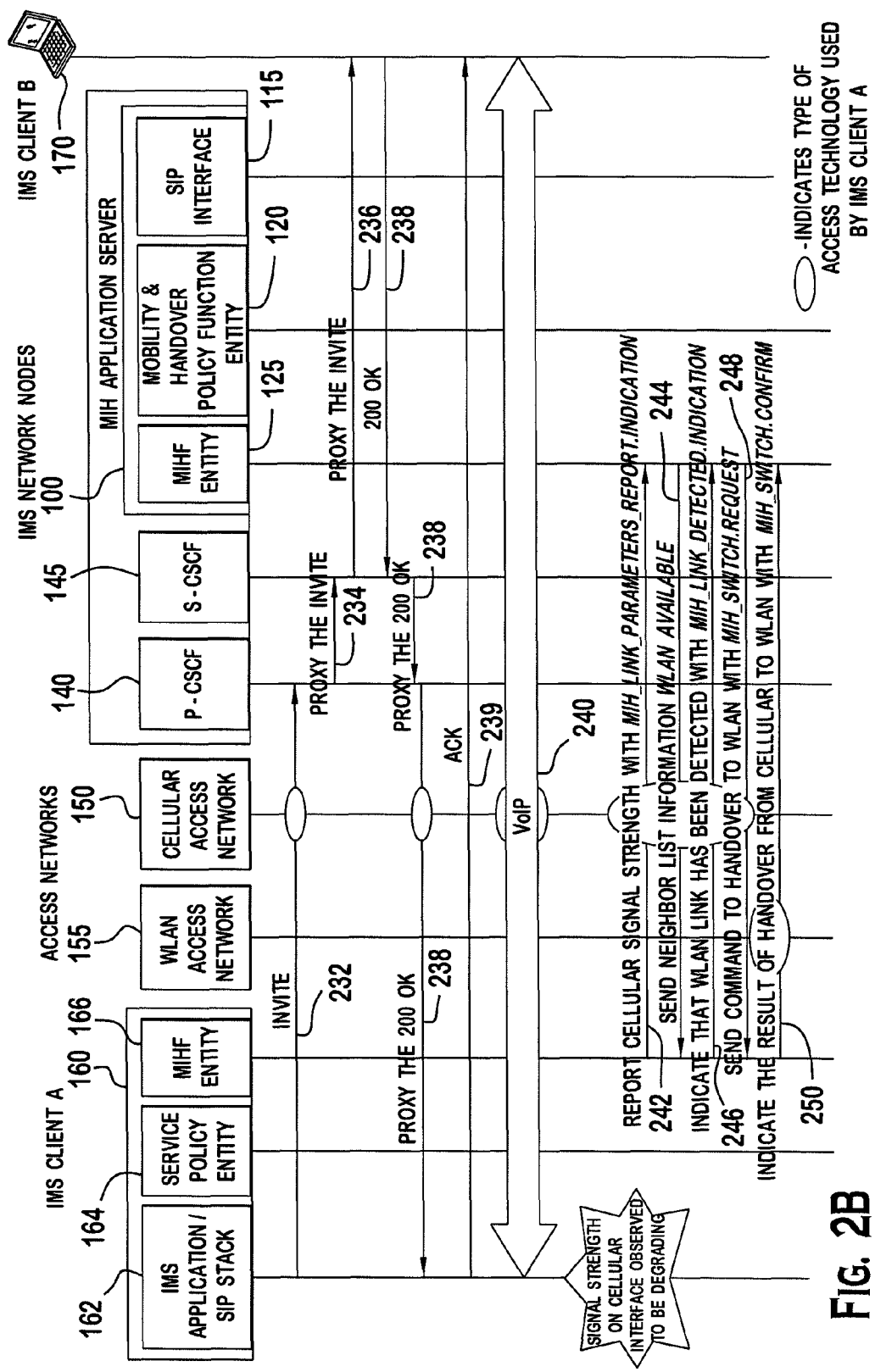
Figure 2C:
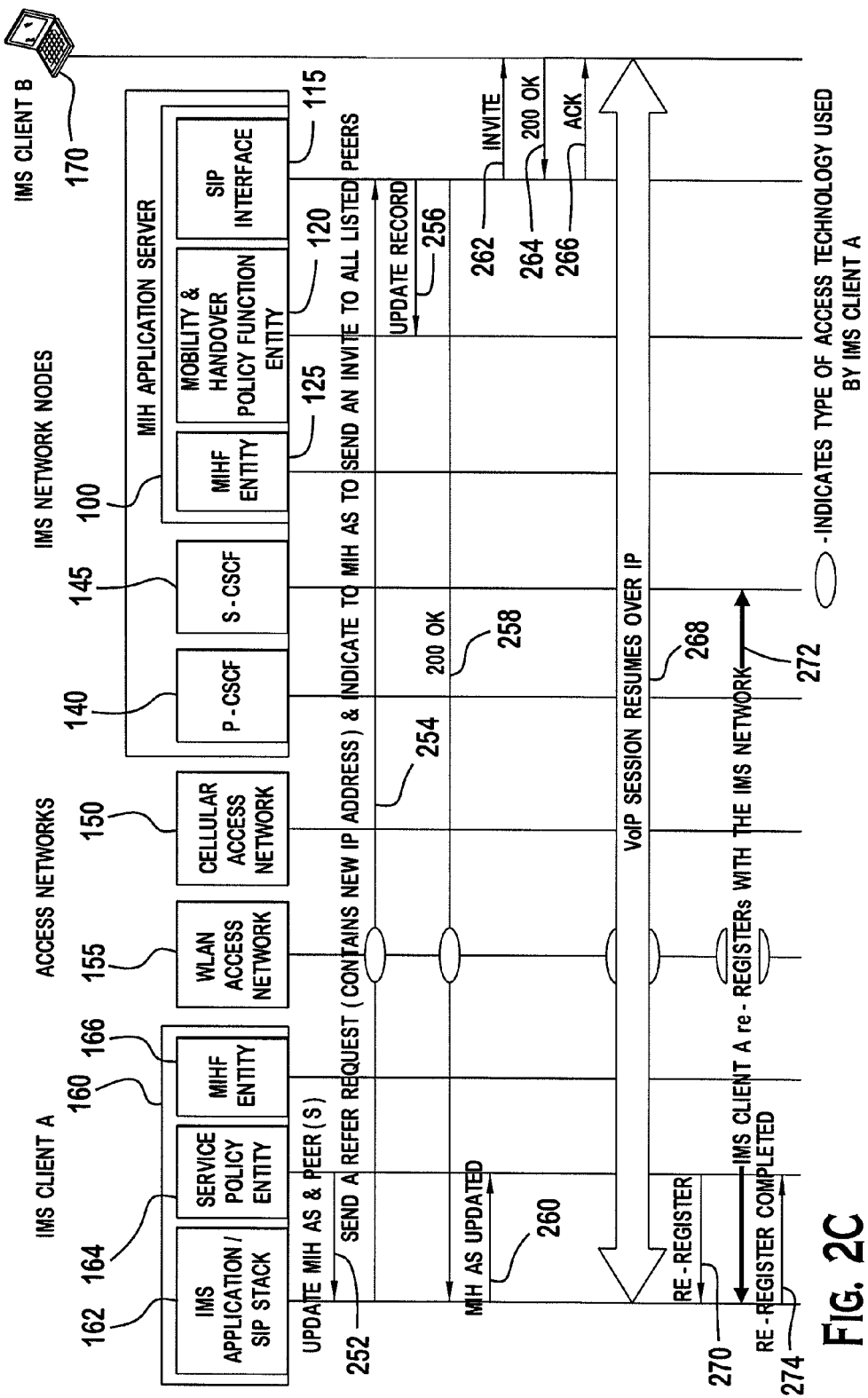
Figure 2D:
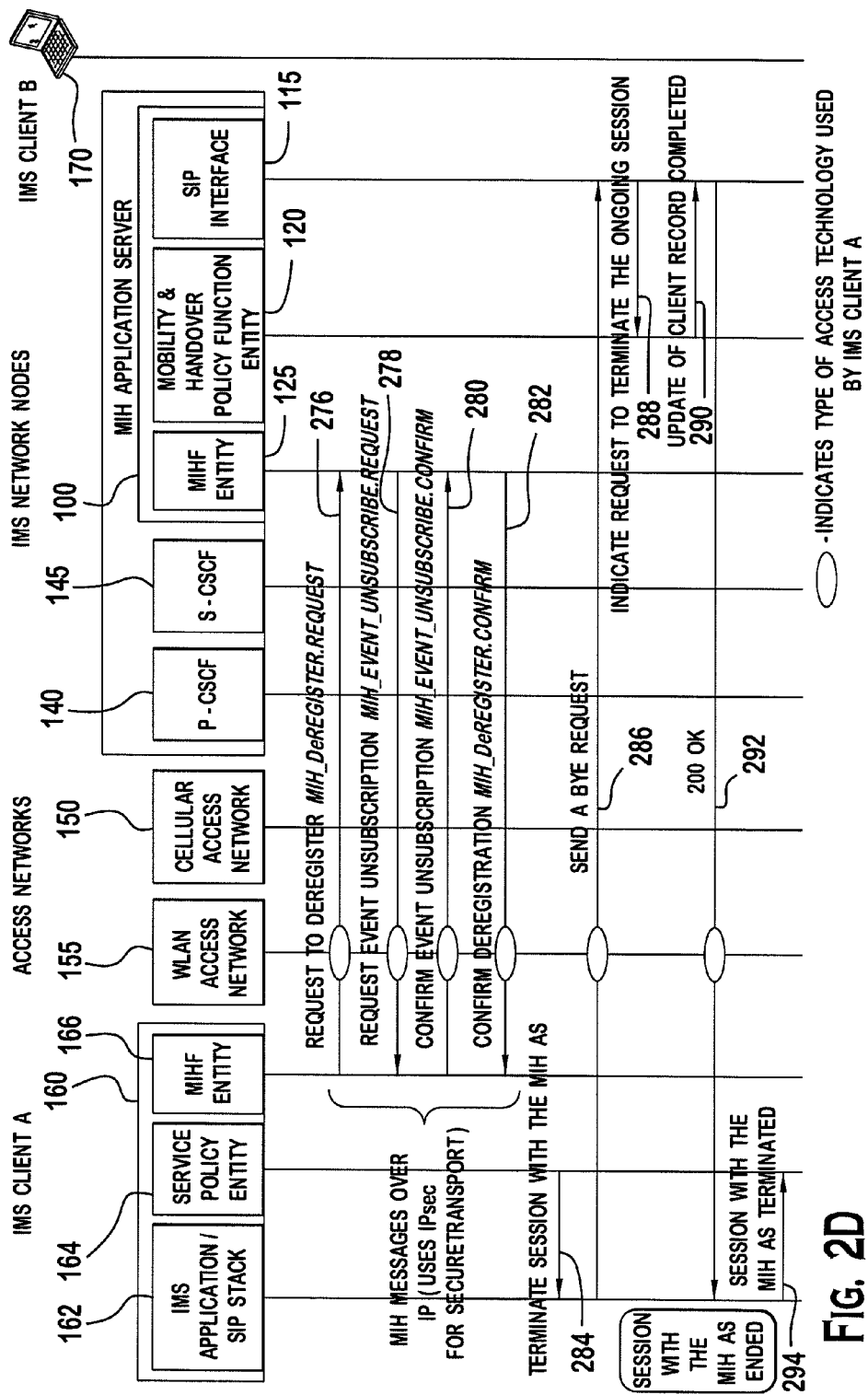
Figure 3A:
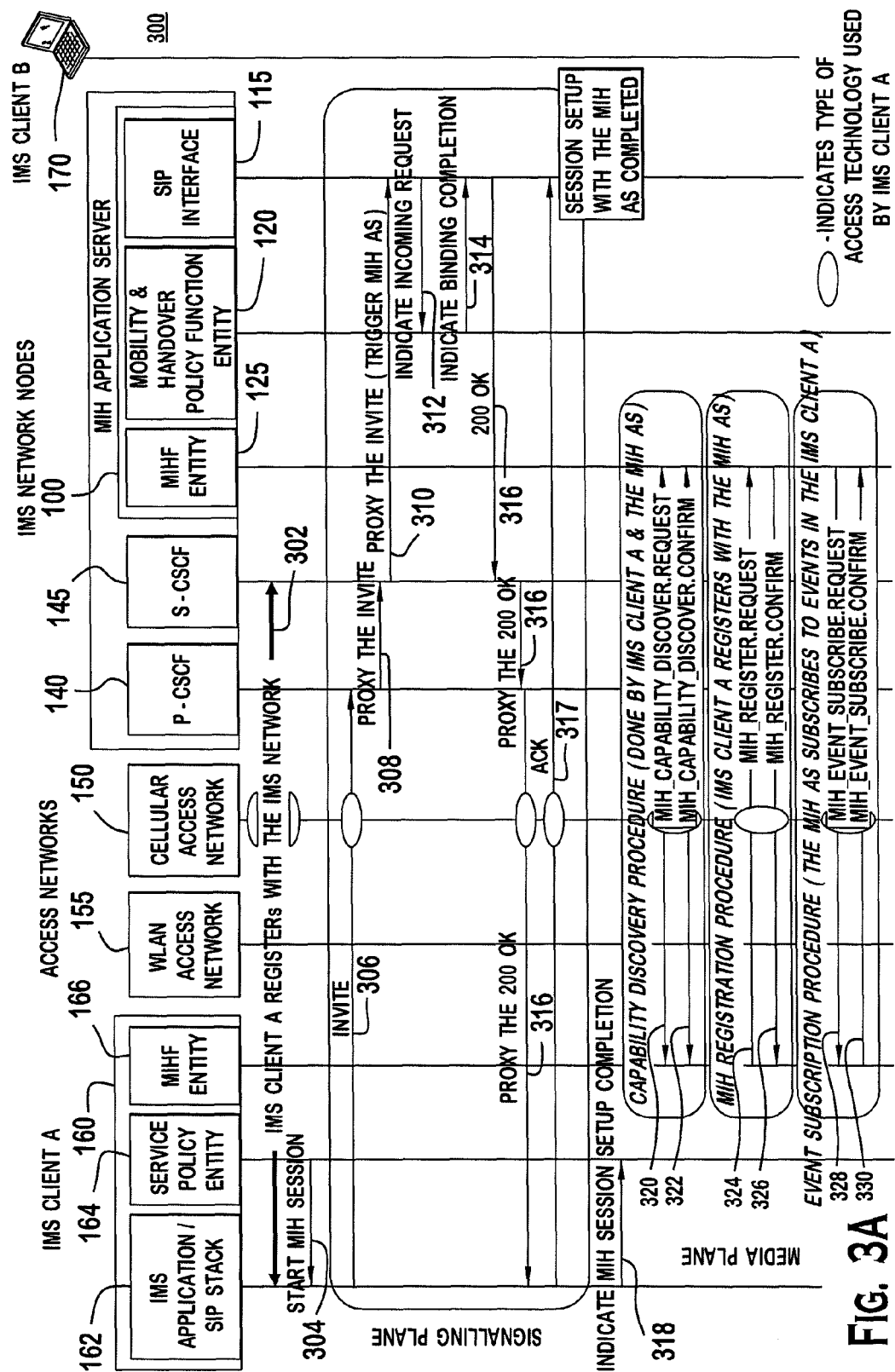
FIGS. 3A-3D are an example call flow for handover in accordance with another embodiment.
Figure 3B:
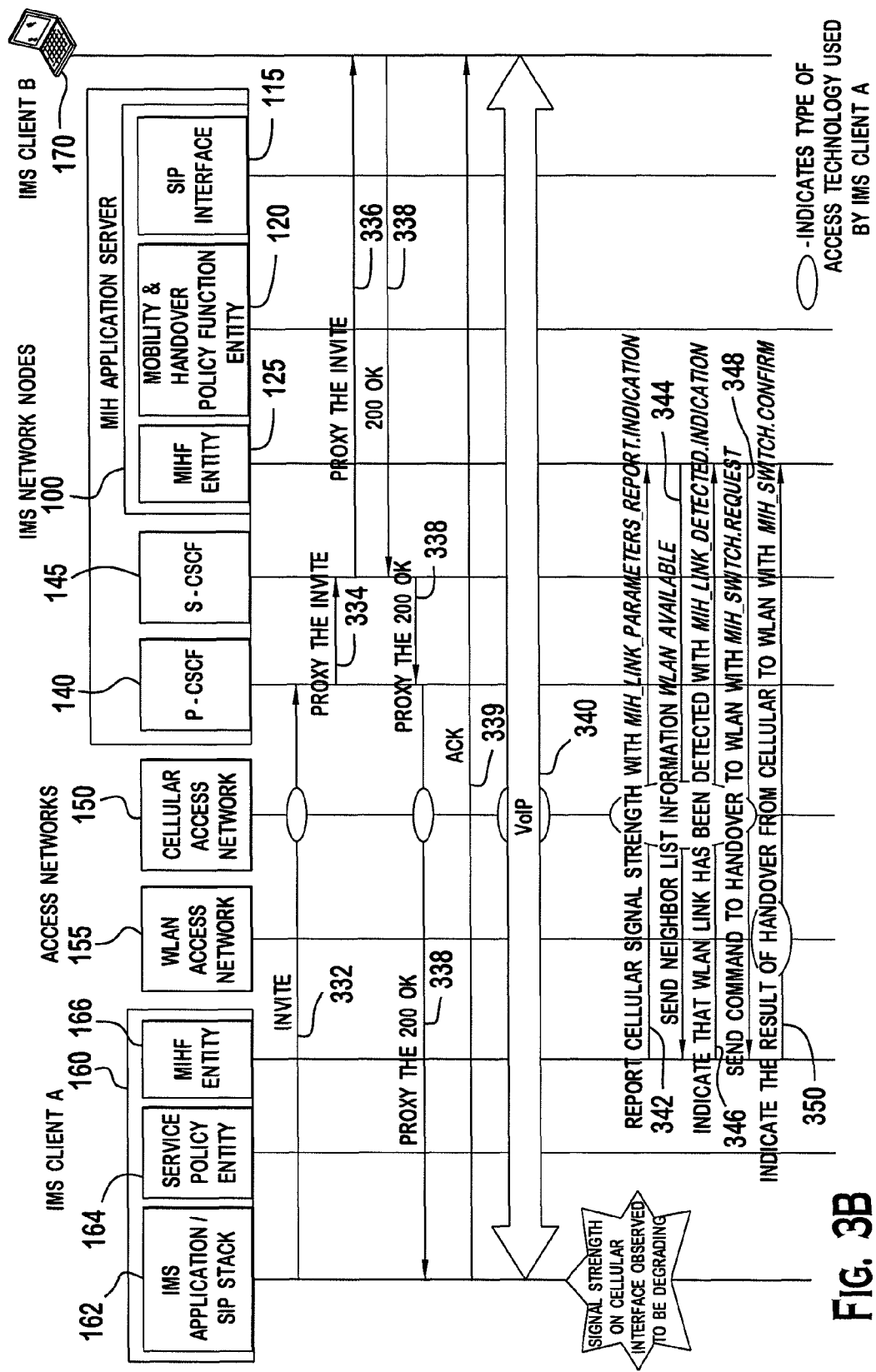
Figure 3C:
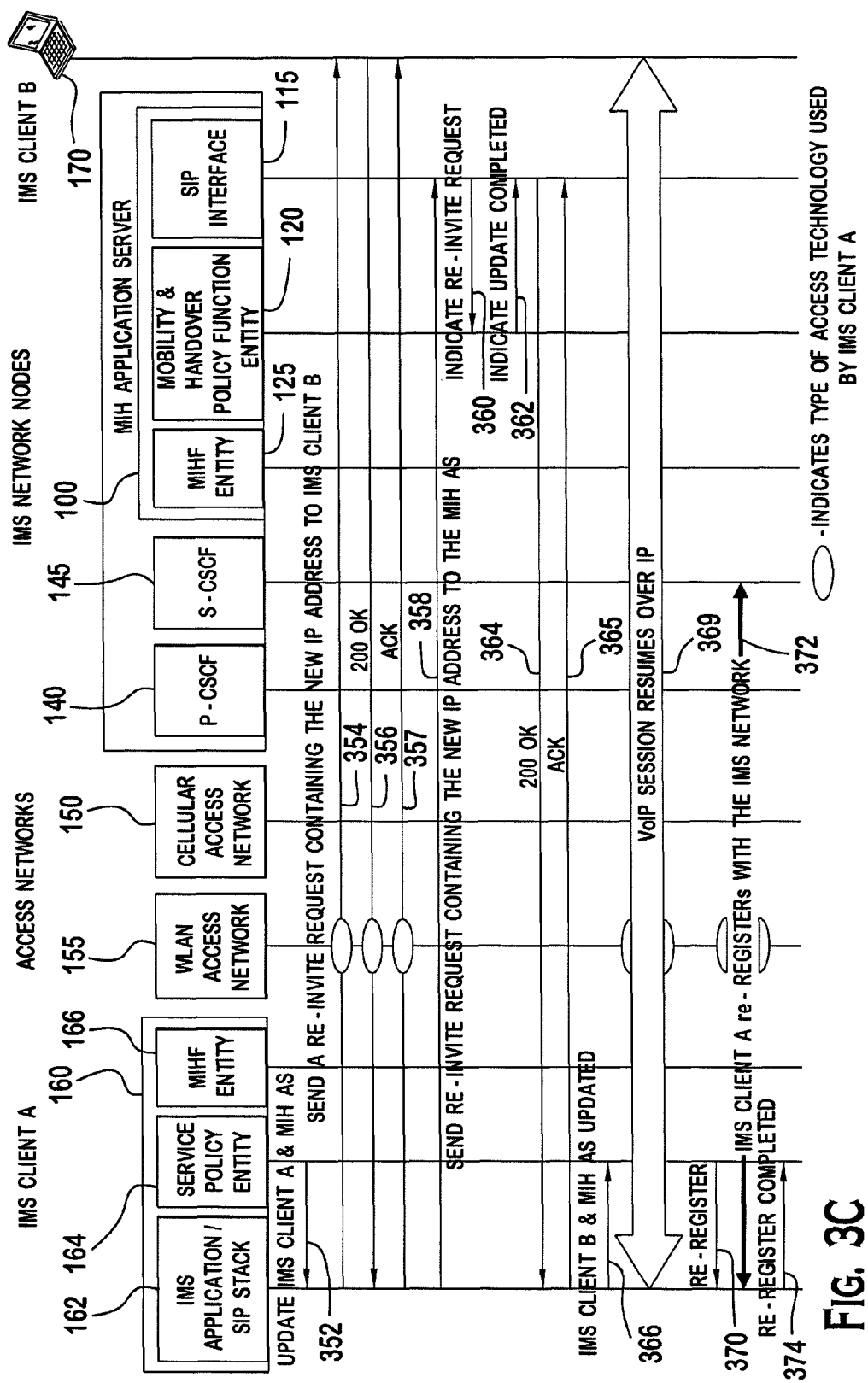
Figure 3D:
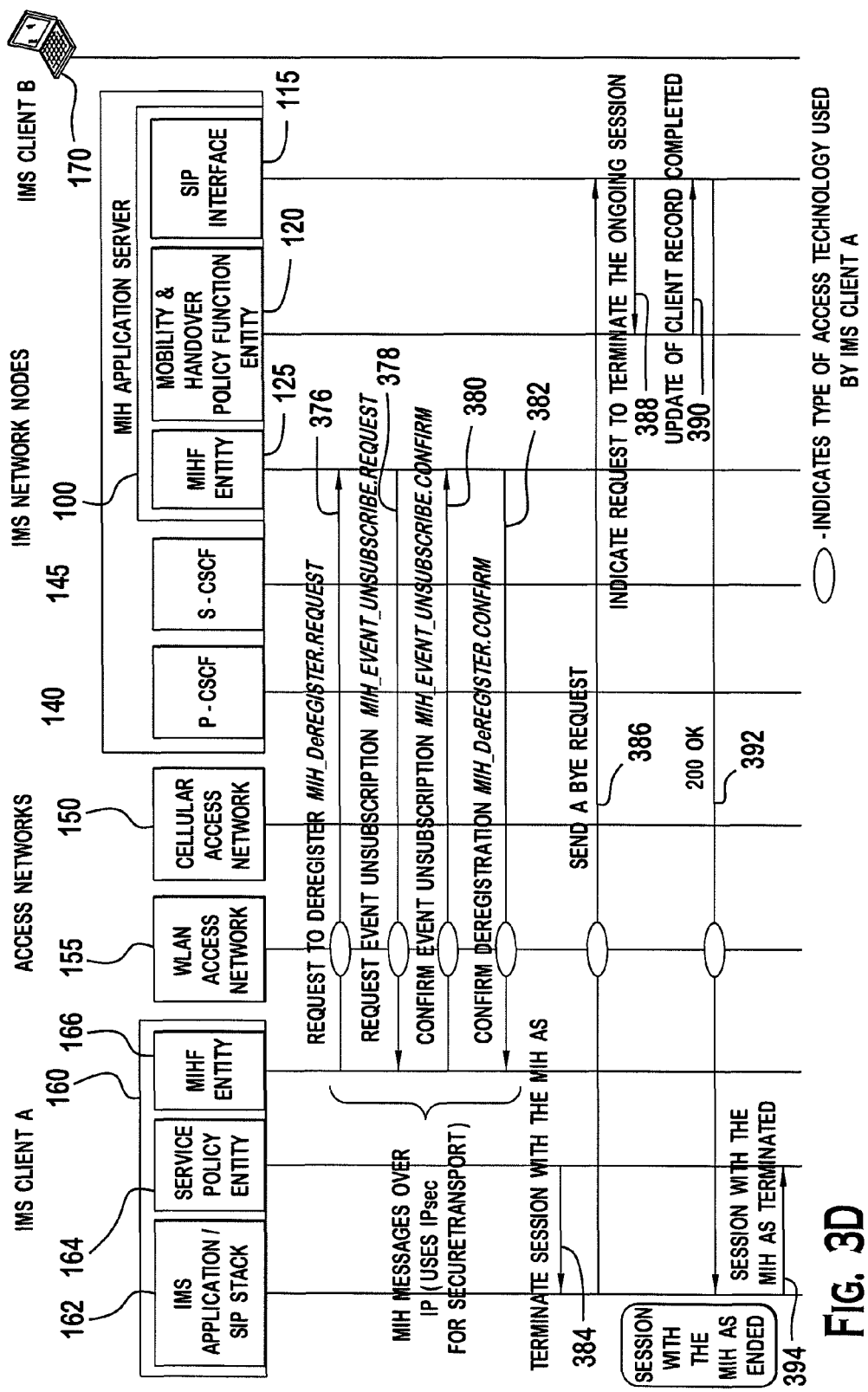

FIG. 1 is a block diagram of an MIH application server 100. The MIH application server 100 includes an MIH function (MIHF) entity 105, an interworking function (IWF) interface 110, an SIP interface 115, a mobility and handover policy function (MHPF) entity 120, a high layer transport unit (e.g., IP-based) 125, and an L2 transport unit (e.g., IEEE 802.xx-based) 130. The MIH application server 100 facilitates seamless integration of IP functions to and from an IMS client, (e.g., a WTRU), over any IMS capable network via the higher layer transport unit 125. The MIH application server 100 facilitates seamless integration of IEEE 802.xx functions to and from the IMS client via an 802.xx access network via the L2 transport unit 130. The MIH application server 100 also supports SIP signaling and interfaces with an S-CSCF in the IMS network via the SIP interface 115.

The MIHF entity 105 receives MIH messages, (i.e., MIH events and information), via the higher layer transport unit 125, (e.g., over IP), and/or the L2 transport unit 130, (e.g., the IEEE 802.xx). The MIHF entity 105 sends MIH message, (i.e., MIH events, information, and command), via the higher layer transport unit 125 or the L2 transport unit 130 in response to the MIH messages. The MIHF entity 105 may also output events signaling to the MHPF entity 120, (e.g., the change of the current state of the link layer technology supporting the session), or to the IWF interface 110, (e.g., indicating the successful completion of a handover).

The IWF interface 110 translates SIP messages received via the SIP interface 115 into MIH messages, and vice versa. The IWF interface 110 receives events from the MIHF entity

105, SIP signaling from the SIP interface 115 and commands from the MHPF entity 120 and translates them into either MIH or SIP signaling.

The MHPF entity 120 dynamically determines the specific behavior and mapping of SIP messages to MIH messages, and vice versa. The MHPF entity 120 controls handovers across heterogeneous networks. The MHPF entity 120 receives handover events and SIP signaling, and outputs handover commands and SIP call control signaling.

The SIP interface 115 receives commands from the MHPF entity 120 for session control purposes, and may also receive events from the MIHF entity 120 via the IWF interface 110. The SIP interface 115 outputs SIP signaling for call/session control purposes.

FIGS. 2A-2D are an example call flow 200 for handover in accordance with one embodiment. Hereinafter, it is assumed that an IMS client 160 is initially connected to a cellular access network 150 and performs a handover to a wireless local area network (WLAN) access network 155. It should be noted that the opposite scenario is also possible and the handover may be implemented between any types of wireless networks. The IMS client 160, (e.g., WTRU), registers with an IMS network, (i.e., S-CSCF 145), after discovery of a proxy call session control function (P-CSCF) 140 (step 202). A service policy entity 164 of the IMS client 160 initiates an MIH session (step 204). The SIP stack 162 of the IMS client 160 sends an INVITE request to the P-CSCF 140 (step 206). The P-CSCF 140 forwards the INVITE request to the S-CSCF 145 (step 208). The S-CSCF 145 downloads a profile of the IMS client 160 and triggers an MIH application server based on filter criteria (step 210), which will be explained in detail below.

The MIH application server 100 functions in an SIP user agent mode. The SIP interface 115 of the MIH application server 100 fetches a unique identifier and an IP address of the IMS client 160 included in the INVITE request and passes them to the MHPF entity 120 (step 212). The MHPF entity 120 creates a binding for the IMS client 160 and indicates a biding completion to the SIP interface 115 (step 214). The binding may include a unique identifier of the IMS client 160, (e.g., MIHF identity (ID)), a current IP address of the IMS client 160, and a registration state and registration timer associated with the registration state, which will be explained in detail below.

The SIP interface 115 transmits a 200 OK message to the IMS client 160 via the S-CSCF 145 and the P-CSCF 140 (step 216). The IMS client 160 sends an acknowledgement (ACK) to the MIH application server 100 (step 217). An MIH session is then established, and the IMS client 160 and the MIH application server 100 may exchange MIH messages directly over IP.

After MIH session completion is indicated to the service policy entity 164 at step 218, the service policy entity 164 triggers the MIHF entity 166 to send remote MIH messages to the MIH application server 100. The MIHF entity 166 in the IMS client 160 may perform a capability discovery procedure with the MIHF entity 125 in the MIH application server 100 (steps 220, 222). The MIHF entity 166 may also perform an MIH registration procedure for registering for specific services (steps 224, 226). The MIHF entity 125 may perform an event subscription procedure with the MIHF entity 166 (steps 228, 230). The MIH messages exchanged in steps 220-230 may be transmitted over IP, and may be transmitted using IPsec for secure transport. The MIHF entity 125 forwards the remote MIH messages received from the IMS client 160 to the MHPF entity 120. This causes state updates for the IMS client 160. The MHPF entity 120 also triggers the MIHF entity 125 to send remote MIH messages. The transportation of the MIH messages over IP may be performed as disclosed in commonly assigned U.S. Patent Application No. 60/801,786, filed May 19, 2006, which is incorporated by reference as if fully set forth.

The IMS client 160 sends an INVITE request to an IMS client 170, (i.e., communication peer), to establish a VoIP session (steps 232-236). It should be noted that VoIP is an example and any other service session may be established. If the IMS client 170 accepts the invitation, the IMS client 170 sends a 200 OK signal to the IMC client 160 (step 238). The IMS client 160 then sends an ACK to the IMS client 170 (step 239). A VoIP session between the IMS client 160 and the IMS client 170 is then established (step 240).

The IMS client 160 detects that a signal strength on the cellular interface is degrading. The MIHF entity 166 sends a signal strength report to the MIHF entity 125 of the MIH application server 100 (step 242). The MIHF entity 125 sends neighbor list information to the MIHF entity 166 (step 244). The service policy entity 164 turns on a WLAN interface of the IMS client 160 and detects a link based on the neighbor list information, and the MIHF entity 166 sends an indication that a WLAN link has been detected (step 246). The MIHF entity 125 sends a command to the MIHF entity 166 to perform a handover to the WLAN (step 248). The service policy entity 164 completes a handover to the WLAN and obtains a new IP address, (e.g., using a dynamic host configuration protocol (DHCP)), and the MIHF entity 166 indicates the result of handover from the cellular network to the WLAN to the MIHF entity 125 (step 250). The MIH messages exchanged in steps 242-250 may be transmitted over IP, and may be transmitted using IPsec for secure transport. The MIHF entity 125 forwards the remote MIH messages from the IMS client 160 to the MHPF entity 120.

The service policy entity 164 triggers update of the MIH application server 100 and the IMS client 170 (step 252). The IMS client 160 sends a REFER request to the MIH application server 100 (step 254). The REFER request may be defined in either the SIP REFER method of RFC 3535, or the suppression of SIP REFER method implicit subscription, as in RFC 4488. The SIP interface 115 of the MIH application server 100 fetches the new IP address and unique identifier of the source in the REFER request, and send them to the MHPF entity 120, which updates the binding for the IMS client 160 (step 256). The MIH application server 100 sends a 200 OK signal to the IMS client 160. The SIP stack 162 indicates update of the MIH application server to the service policy entity 164 (steps 258, 260).

The MIH application server 100 sends an INVITE request to the IMS client 170 as requested in the REFER request (step 262). The IMS client 170 sends a 200 OK signal to the MIH application server 100, and the MIH application server 100 sends an ACK to the IMS client 170 (steps 264, 266). The VoIP session between the IMS client 160 and the IMS client 170 is resumed using a new IP address of the IMS client 160 (step 268). The IMS re-registration with the IMS network is then performed (steps 270, 272, 274).

If necessary, the IMS client 160 may terminate the MIH session with the MIH application server 100 by sending a BYE request as defined by SIP. If the service policy entity 164 decides to terminate the MIH session with the MIH application server, the MIHF entity 166 sends a request to deregister to the MIHF entity 125 (step 276). The MIHF entity 125 sends a request for event unsubscription to the MIHF entity 166 (step 278). The MIHF entity 166 sends a confirm event unsubscription message to the MIHF entity 125 (step 280). The MIHF entity 125 sends a confirm deregistration message to the MIHF entity 166 (step 282). The MIH messages in steps 276-282 may be sent over IP, and may be sent using IPsec for secure transport. The MHPF entity 120 updates the registration record for the IMS client 160. The service policy entity 164 triggers termination of the MIH session with the MIH application server at step 284, and a BYE request is sent to the MIH application server 100 at step 286. It is indicated to the MHPF entity 120 to terminate the MIH session (step 288). The MHPF entity 120 indicates update completion of the IMS client record and a 200 OK signal is sent to the IMS client 160 (steps 290, 292). The MIH session is then ended, and a termination of the MIH session is indicated to the service policy entity 164 (step 294).

FIGS. 3A-3D are an example call flow 300 for handover in accordance with another embodiment. Hereinafter, it is assumed that an IMS client 160 is initially connected to a cellular access network 150 and performs a handover to a wireless local area network (WLAN) access network 155. It should be noted that the opposite scenario is also possible and the handover may be implemented between any types of wireless networks. The IMS client 160, (e.g., WTRU), registers with an IMS network, (i.e., S-CSCF 145), after discovery of a proxy call session control function (P-CSCF) 140 (step 302). A service policy entity 164 of the IMS client 160 initiates an MIH session (step 304). The SIP stack 162 of the IMS client 160 sends an INVITE request to the P-CSCF 140 (step 306). The P-CSCF 140 forwards the INVITE request to the S-CSCF 145 (step 308). The S-CSCF 145 downloads a profile of the IMS client 160 and triggers an MIH application server based on filter criteria (step 310), which will be explained in detail below.

The MIH application server 100 functions in an SIP user agent mode. The SIP interface 115 of the MIH application server 100 fetches a unique identifier and an IP address of the IMS client 160 included in the INVITE request and passes them to the MHPF entity 120 (step 312). The MHPF entity 120 creates a binding for the IMS client 160 and indicates a biding completion to the SIP interface 115 (step 314). The binding may include a unique identifier of the IMS client 160, (e.g., MIHF ID), a current IP address of the IMS client 160, and a registration state and registration timer associated with the registration state, which will be explained in detail below.

The SIP interface 115 transmits a 200 OK message to the IMS client 160 via the S-CSCF 145 and the P-CSCF 140 (step 316). The IMS client 160 sends an ACK to the MIH application server 100 (step 317). An MIH session is then established, and the IMS client 160 and the MIH application server 100 may exchange MIH messages directly over IP.

After MIH session completion is indicated to the service policy entity 164 at step 318, the service policy entity 164 triggers the MIHF entity 166 to send remote MIH messages to the MIH application server 100. The MIHF entity 166 in the IMS client 160 may perform a capability discovery procedure with the MIHF entity 125 in the MIH application server 100 (steps 320, 322). The MIHF entity 166 may also perform an MIH registration procedure for registering for specific services (steps 324, 326). The MIHF entity 125 may perform an event subscription procedure with the MIHF entity 166 (steps 328, 330). The MIH messages exchanged in steps 320-330 may be transmitted over IP, and may be transmitted using IPsec for secure transport. The MIHF entity 125 forwards the remote MIH messages received from the IMS client 160 to the MHPF entity 120. This causes state updates for the IMS client 160. The MHPF entity 120 also triggers the MIHF entity 125 to send remote MIH messages. The transportation of the MIH messages over IP may be performed as defined in commonly assigned U.S. Patent Application No. 60/801,786, filed May 19, 2006.

The IMS client 160 sends an INVITE request to an IMS client 170, (i.e., communication peer), to establish a VoIP session (steps 332-336). It should be noted that VoIP is an example and any other service session may be established. If the IMS client 170 accepts the invitation, the IMS client 170 sends a 200 OK signal to the IMC client 160 (step 338). The IMS client 160 then sends an ACK to the IMS client 170 (step 339). A VoIP session between the IMS client 160 and the IMS client 170 is then established (step 340).

The IMS client 160 detects that a signal strength on the cellular interface is degrading. The MIHF entity 166 sends a signal strength report to the MIHF entity 125 of the MIH application server 100 (step 342). The MIHF entity 125 sends neighbor list information to the MIHF entity 166 (step 344). The service policy entity 164 turns on a WLAN interface of the IMS client 160 and detects a link based on the neighbor list information, and the MIHF entity 166 sends an indication that a WLAN link has been detected (step 346). The MIHF entity 125 sends a command to the MIHF entity 166 to perform a handover to the WLAN (step 348). The service policy entity 164 completes a handover to the WLAN and obtains a new IP address, (e.g., using a DHCP), and the MIHF entity 166 indicates the result of handover from the cellular network to the WLAN to the MIHF entity 125 (step 350). The MIH messages exchanged in steps 342-350 may be transmitted over IP, and may be transmitted using IPsec for secure transport. The MIHF entity 125 forwards the remote MIH messages from the IMS client 160 to the MHPF entity 120.

The service policy entity 164 triggers update of the MIH application server 100 and the IMS client 170 (step 352). The IMS client 160 sends a RE-INVITE request to the IMS client 170 (step 354). The IMS client 160 indicates the new IP address and the call identifier related to the ongoing VoIP session. The IMS client 170 accepts the RE-INVITE request and sends a 200 OK message to the IMS client 160 (step 356). The IMS client 160 sends an ACK to the IMS client 170 (step 357).

The IMS client 160 then sends a RE-INVITE request to the MIH application server 100 (step 358). The SIP interface 115 of the MIH application server 100 fetches the new IP address and unique identifier of the source in the RE-INVITE request, and send them to the MHPF entity 120, which updates the binding for the IMS client 160 (step 360). The MHPF entity 120 indicates update complete to the SIP interface 115 (step 362). The MIH application server 100 sends a 200 OK signal to the IMS client 160 (step 364). The IMS client 160 sends an ACK to the MIH application server 100 (step 365). Updating completion of the IMA client 170 and the MIH application server 100 is indicated to the service policy entity 164 at step 366 and the VoIP session between the IMS client 160 and the IMS client 170 is resumed using the new IP address of the IMS client 160 (step 368). The IMS re-registration with the IMS network is then performed (steps 370, 372, 374).

If necessary, the IMS client 160 may terminate the MIH session with the MIH application server 100 by sending a BYE request as defined by SIP. If the service policy entity 164 decides to terminate the MIH session with the MIH application server, the MIHF entity 166 sends a request to deregister to the MIHF entity 125 (step 376). The MIHF entity 125 sends a request for event unsubscription to the MIHF entity 166 (step 378). The MIHF entity 166 sends a confirm event unsubscription message to the MIHF entity 125 (step 380). The MIHF entity 125 sends a confirm deregistration message to the MIHF entity 166 (step 382). The MIH messages in steps 376-382 may be sent over IP, and may be sent using IPsec for secure transport. The MHPF entity 120 updates the registration record for the IMS client 160. The service policy entity 164 triggers termination of the MIH session with the MIH application server at step 384, and a BYE request is sent to the MIH application server 100 at step 386. It is indicated to the MHPF entity 120 to terminate the MIH session (step 288). The MHPF entity 120 indicates update completion of the IMS client record and a 200 OK signal is sent to the IMS client 160 (steps 390, 392). The MIH session is ended and a termination of the MIH session is indicated to the service policy entity 164 (step 394).

The S-CSCF 145 triggers the MIH application server after receiving the INVITE request from the IMS client 160. The INVITE request message body is constructed using a session description protocol (SDP). Multipurpose Internet mail extensions (MIME) encoding may be used for the message body. In an 's' header of the INVITE request message, a constant string "MIH Services" and a unique identifier of the IMS client 160 may be included. The unique identifier may be an MIHF ID.

The S-CSCF triggers the MIH application server based on the request method, an SIP uniform resource identifier (URI) of destination, and an existence of the specific string, (i.e., the constant string "MIH Services" and the unique identifier), in the INVITE request message body. The request method refers to whether the request is an INVITE request message or a REFER request message. The SIP URI refers to the URI for the MIH application service in this case. For example, the URI may be ieee802.21@domain.com.

FIG. 4 is an example INVITE request message 400. The message 400 includes an example MIH application server public URI 402 and an s header 404 including the string "MIH Services" and a unique ID of the IMS client, (e.g., MIHF ID).

FIG. 5 is an example REFER request message 500. The message 500 includes an example MIH application server public URI 502 and an s header 504 including the string "MIH Services" and a unique ID of the IMS client, (e.g., MIHF ID). The message 500 also includes call ID 506 of the ongoing data session with the other IMS client 170. The MIH application server 100 uses this when construction the INVITE request to the IMS client 170.

FIG. 6 is an example RE-INVITE request message 600 destined for an IMS client 170.

FIG. 7 is an example RE-INVITE request message 700 destined for an MIH application server 100. The message 700 includes an example MIH application server public URI 702 and an s header 704 including the string "MIH Services" and a unique ID of the IMS client, (e.g., MIHF ID).

The MIH application server 100, (i.e., the MHPF entity 120), creates a binding for an IMS client 160. The binding includes a unique identifier of the IMS client, (e.g., MIHF ID), a current IP address of the IMS client, and a registration state of the IMS client and a registration timer associated to the registration state. Five registration states are defined, (unregistered, pending MIH registration, MIH registered and active, MIH registered and inactive, and pending MIH deregistration), and the registration state changes if the corresponding timer expires, or if a specific MIH/SIP message is received instructing it to change.

Figure 8:
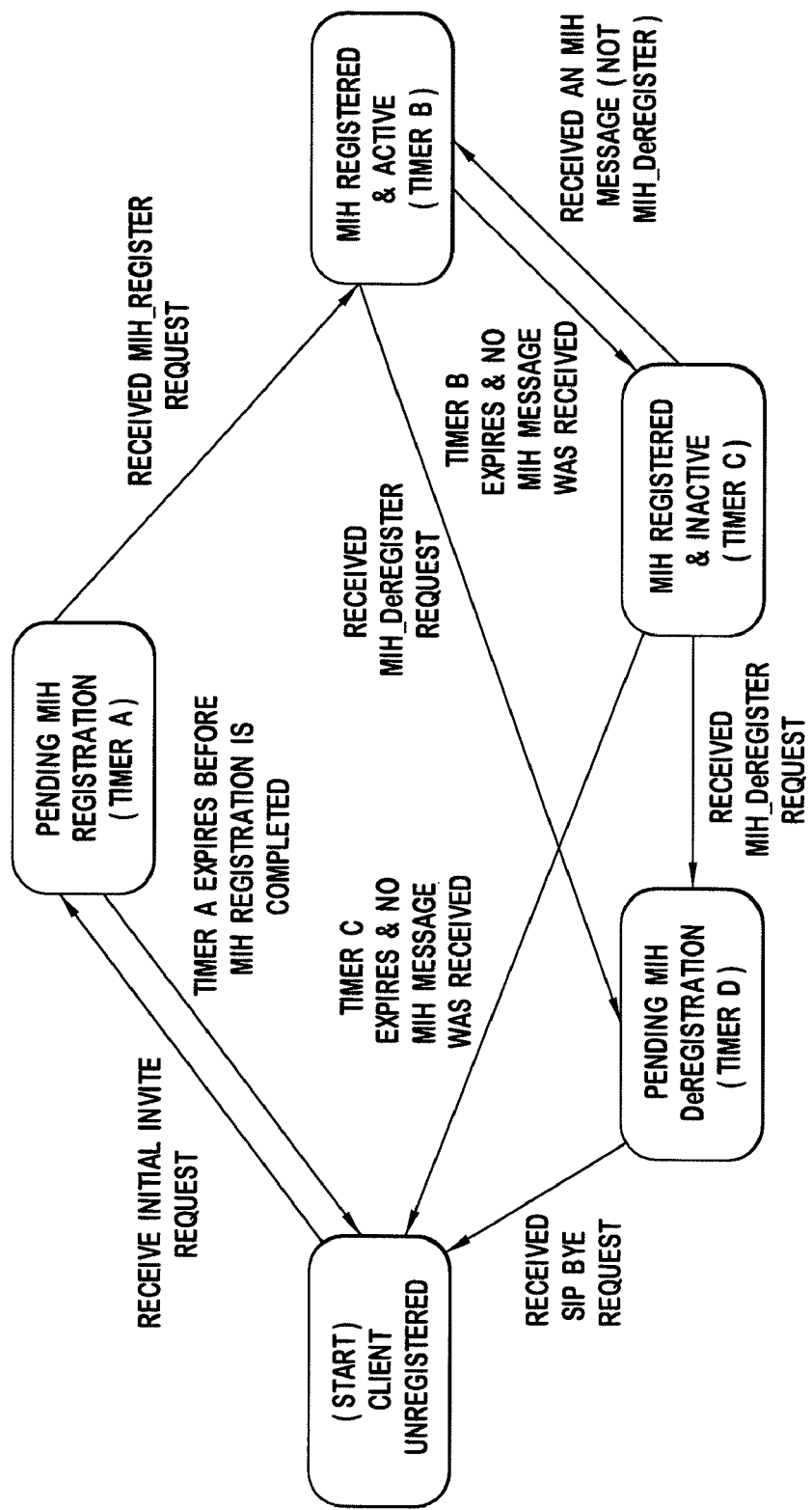
FIG. 8 is registration state changes of the IMS client.

FIG. 8 is registration state changes of the IMS client. In the unregistered state, the client does not have any record at the MIH application server. No timer is associated with the unregistered state.

Upon receipt of an initial INVITE request, the state changes to the pending MIH registration state. In the pending MIH registration state, the IMS client has created a session but has not performed MIH registration. MIH registration is a process of registering for specific negotiated services. The pending MIH registration state is associated with timer A. MIH registration must be completed within a timer A value; otherwise the MIH application server terminates the session, (i.e., unregistered state). If an IMS client's state changes to the unregistered state, all related user information is deleted. If MIH registration is performed with the timer A value, the state changes to the MIH registered and active state.

In the MIH registered and active state, the IMS client has completed MIH registration and communicates with the MIH application server. The registered and active state is associated with timer B. If no communication occurs before timer B expires, a state changes to the MIH registered and inactive state. If an MIH deregister request is received, the state changes to the pending MIH deregistration state.

In the MIH registered and inactive state, the IMS client has completed MIH registration, but has not been in communication with the MIH application server for a specific time period. The MIH registered and inactive state is associated with timer C. The session expires if no communication with the MIH application server occurs before timer C expires, (i.e., the state changes to the unregistered state). If communication other than a deregistration request is received before timer C expires, the state changes to the MIH registered and active state. If a deregistration request is received before timer C expires, the state changes to the pending MIH deregistration state.

In the pending MIH deregistration state, the IMS client has performed MIH deregistration and is about to terminate the session. The pending deregistration state is associated with timer D. An SIP BYE message must be received by the MIH application server within a timer D value; otherwise the MIS application server performs a "manual" session termination, (i.e., remove all records of the IMS client).

Table 1 shows example timer values.

TABLE 1

| Registration state | Associated timer | Example timer value |
| --- | --- | --- |
| Unregistered | None | None |
| Pending MIH registration | Timer A | 10 seconds |
| MIH registered and active | Timer B | 3000 seconds |
| MIH registered and inactive | Timer C | 2000 seconds |
| Pending MIH deregistration | Timer C | 10 seconds |

Although the features and elements are described in particular combinations, each feature or element can be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

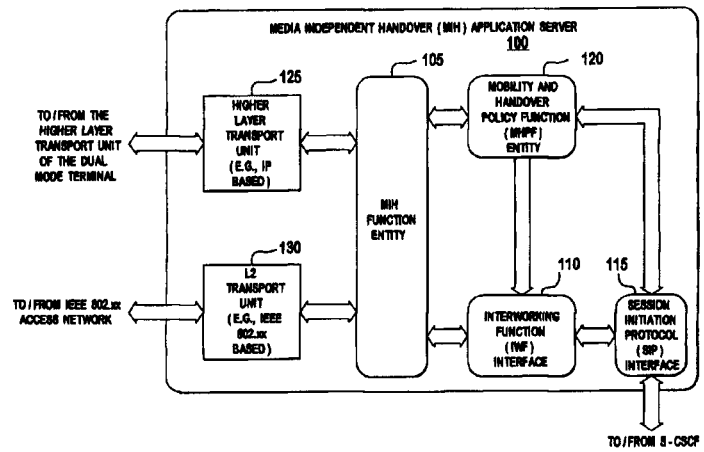

What is claimed is:

1. A method of performing a handover, the method comprising:
    an Internet protocol (IP) multimedia subsystem (IMS) client registering with an IMS network;
    the IMS client establishing a media independent handover (MIH) session with an MIH application server using a session initiation protocol (SIP) by sending an INVITE request from the IMS client to a proxy call session control function (P-CSCF), the INVITE request including a string "MIH services" and a unique identifier of an IMS client;
    the IMS client establishing a session for IP-based service with a communication peer using an SIP;
    the IMS client exchanging an MIH message for a handover with the MIH application server over an IP;
    the IMS client performing a handover;
    the IMS client sending a RE-INVITE request or a REFER request to resume the session for IP-based service, the RE-INVITE request and the REFER request including a string "MIH services" and the unique identifier of the IMS client; and
    the IMS client resuming the session for IP-based service.

2. The method of claim 1 further comprising:
    the IMS client performing a capability discovery procedure with the MIH application server over an IP.

3. The method of claim 1 further comprising:
    the IMS client performing an MIH registration procedure with the MIH application server over an IP.

4. The method of claim 1 further comprising:
    the IMS client performing an event subscription procedure with the MIH application server over an IP.

5. The method of claim 1 further comprising:
    the IMS client sending a signal strength report to the MIH application server over an IP;
    the IMS client receiving neighbor list information from the MIH application server over an IP;
    the IMS client detecting a link based on the neighbor list information;
    the IMS client sending an indication that a link has been detected;
    the IMS client receiving a handover command from the MIH application server over an IP; and
    the IMS client sending a result of handover to the MIH application server over an IP.

6. The method of claim 1 further comprising:
    the IMS client sending a deregistration request to the MIH application server over an IP; and
    the IMS client sending a BYE request to the MIH application server to terminate the MIH session.

7. A method of performing a handover, the method comprising:
    receiving an INVITE request from an Internet protocol (IP) multimedia subsystem (IMS) client via a serving call session control function (S-CSCF), the INVITE request including a string "MIH services" and a unique identifier of the IMS client;
    creating a binding for the IMS client;
    establishing a media independent handover (MIH) session with the IMS client using a session initiation protocol (SIP);
    sending a handover command to the IMS client;
    receiving a handover result from the IMS client;
    receiving a RE-INVITE request or a REFER request from the IMS client, the RE-INVITE request and the REFER request including a string "MIH services" and a unique identifier of an IMS client; and
    updating the binding.

8. The method of claim 7 wherein the unique identifier is an MIH function (MIHF) identifier.

9. The method of claim 7 wherein a registration state and registration timer is maintained in the binding for the IMS client.

10. The method of claim 9 wherein the registration state is one of an unregistered state, a pending registration state, a registered and active state, a registered and inactive state, and a pending deregistration state.

11. A wireless transmit/receive unit (WTRU) for performing a handover, the WTRU comprising:
    a transceiver;
    a processor configured to establish a session for IP-based service with a communication peer using a session initiation protocol (SIP);
    the processor configured to establish a media independent handover (MIH) session with an MIH application server using an SIP and perform a handover so that the session for IP-based service is resumed after the handover; and
    the processor configured to exchange an MIH message with the MIH application server over an IP, wherein the MIH session is established by sending an INVITE request to a proxy call session control function (P-CSCF) and a RE-INVITE request or a REFER request is sent to the MIH application server after handover to resume the session for IP-based service, the INVITE request, the RE-INVITE request and the REFER request including a string "MIH services" and a unique identifier of an IMS client.

12. The WTRU of claim 11 wherein the unique identifier is an MIH function (MIHF) identifier.

13. The WTRU of claim 11 wherein the processor is configured to perform a capability discovery procedure with the MIH application server over an IP.

14. The WTRU of claim 11 wherein the processor is configured to perform an MIH registration procedure with the MIH application server over an IP.

15. The WTRU of claim 11 wherein the processor is configured to perform an event subscription procedure with the MIH application server over an IP.

16. The WTRU of claim 11 wherein the processor is configured to send a signal strength report to the MIH application server over an IP, receive neighbor list information from the MIH application server over an IP, send an indication that a link has been detected based on the neighbor list information, receive a handover command from the MIH application server over an IP, and send a result of handover to the MIH application server over an IP.

17. A media independent handover (MIH) application server for supporting a handover, the MIH application server comprising:
- a receiver for receiving an INVITE request from an Internet protocol (IP) multimedia subsystem (IMS) client via a serving call session control function (S-CSCF), the INVITE request includes a string "MIH services" and a unique identifier of an IMS client;
- a processor for creating a binding for the IMS client and establishing an MIH session with the IMS client, the processor is configured to update the binding based on a RE-INVITE request or a REFER request from the IMS client, the RE-INVITE request and the REFER request including a string "MIH services" and the unique identifier of the IMS client; and
- the processor for exchanging an MIH message for a handover with the IMS client over an IP.

18. The MIH application server of claim 17 wherein the processor is configured to send a handover command to the IMS client and receive a handover result from the IMS client.

19. The MIH application server of claim 17 wherein a registration state and registration timer is maintained in the binding for the IMS client.

20. The MIH application server of claim 19 wherein the registration state is one of an unregistered state, a pending registration state, a registered and active state, a registered and inactive state, and a pending deregistration state.

* * * * *

UNITED STATES PATENT AND TRADEMARK OFFICE
CERTIFICATE OF CORRECTION

| | | |
|---|---|---|
| PATENT NO. | : 8,134,955 B2 | Page 1 of 1 |
| APPLICATION NO. | : 12/015923 | |
| DATED | : March 13, 2012 | |
| INVENTOR(S) | : Rahman et al. | |

It is certified that error appears in the above-identified patent and that said Letters Patent is hereby corrected as shown below:

IN THE CLAIMS

At column 12, after line 12, insert --21. The MIH application server of claim 17 wherein the unique identifier is an MIH function (MIHF) identifier.--.

Signed and Sealed this
Ninth Day of April, 2013

Teresa Stanek Rea
*Acting Director of the United States Patent and Trademark Office*

UNITED STATES PATENT AND TRADEMARK OFFICE
CERTIFICATE OF CORRECTION

PATENT NO. : 8,134,955 B2
APPLICATION NO. : 12/015923
DATED : March 13, 2012
INVENTOR(S) : Rahman et al.

It is certified that error appears in the above-identified patent and that said Letters Patent is hereby corrected as shown below:

Delete the title page and substitute therefore the attached title page showing the corrected number of claims in patent.

IN THE CLAIMS

At column 12, after line 12, insert --21. The MIH application server of claim 17 wherein the unique identifier is an MIH function (MIHF) identifier.--.

This certificate supersedes the Certificate of Correction issued April 9, 2013.

Signed and Sealed this
Thirtieth Day of April, 2013

Teresa Stanek Rea
*Acting Director of the United States Patent and Trademark Office*

(12) United States Patent
Rahman et al.

(10) Patent No.: US 8,134,955 B2
(45) Date of Patent: Mar. 13, 2012

(54) METHOD AND APPARATUS FOR MEDIA INDEPENDENT HANDOVER

(75) Inventors: Shamim Akbar Rahman, Montreal (CA); Ulises Olvera-Hernandez, Kirkland (CA); Mahmoud Watfa, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 1030 days.

(21) Appl. No.: 12/015,923

(22) Filed: Jan. 17, 2008

(65) Prior Publication Data

US 2008/0175253 A1    Jul. 24, 2008

Related U.S. Application Data

(60) Provisional application No. 60/885,505, filed on Jan. 18, 2007.

(51) Int. Cl.
*H04W 4/00* (2009.01)
(52) U.S. Cl. .................................. 370/328; 370/331
(58) Field of Classification Search ................ None
See application file for complete search history.

(56) References Cited

U.S. PATENT DOCUMENTS

| | | | |
|---|---|---|---|
| 6,965,767 B2 | 11/2005 | Maggenti et al. | |
| 7,406,324 B1 | 7/2008 | McConnell | |
| 7,483,984 B1 | 1/2009 | Jonker et al. | |
| 2003/0225912 A1 | 12/2003 | Takeda et al. | |
| 2004/0153547 A1 | 8/2004 | Trossen | |
| 2006/0274697 A1 | 12/2006 | Kim et al. | |
| 2006/0276192 A1 | 12/2006 | Dutta et al. | |
| 2006/0277298 A1 * | 12/2006 | Kim et al. | 709/224 |
| 2006/0291423 A1 | 12/2006 | Carlton | |
| 2007/0072605 A1 | 3/2007 | Poczo | |
| 2007/0091846 A1 * | 4/2007 | Kim et al. | 370/331 |
| 2007/0110075 A1 | 5/2007 | Olvera-Hernandez | |
| 2007/0197214 A1 | 8/2007 | Faccin et al. | |

(Continued)

FOREIGN PATENT DOCUMENTS

RU    2283542    9/2006

(Continued)

OTHER PUBLICATIONS

Al Mosawi et al., "A Novel Micro Mobility Solution Based on Media Independent Handover and SIP," IEEE Vehicular Technology Conference, pp. 1-5 (Sep. 1, 2006).

(Continued)

*Primary Examiner* — Nittaya Juntima
*Assistant Examiner* — Tito Pham
(74) *Attorney, Agent, or Firm* — Volpe and Koenig, P.C.

(57) ABSTRACT

A method and apparatus for performing a handover are disclosed. An Internet protocol (IP) multimedia subsystem (IMS) client registers with an IMS network and establishes a media independent handover (MIH) session with an MIH application server using a session initiation protocol (SIP). The IMS client establishes a session for IP-based service, (e.g., voice over IP (VoIP)), with a communication peer using an SIP. MIH messages are exchanged for handover with the MIH application server over IP. After handover, the session is resumed. A serving call session control function (S-CSCF) triggers the MIH application server based on a string "MIH services" and a unique identifier included in an INVITE request. The IMS client may send a REFER request to the MIH application server after the handover to resume the session. Alternatively, the IMS client may send a RE-INVITE request to the MIH application server and the communication peer.

21 Claims, 14 Drawing Sheets